(12) United States Patent
Michiuchi et al.

(10) Patent No.: US 10,858,252 B2
(45) Date of Patent: Dec. 8, 2020

(54) COMPLEX CARBONITRIDE POWDER AND METHOD FOR PRODUCING SAME

(71) Applicants: Sumitomo Electric Industries, Ltd., Osaka (JP); A.L.M.T. Corp., Tokyo (JP)

(72) Inventors: Masato Michiuchi, Itami (JP); Keiichi Tsuda, Itami (JP); Yoshihiro Minato, Itami (JP); Tomoyuki Ishida, Toyama (JP); Akihide Matsumoto, Toyama (JP); Takehiko Hayashi, Toyama (JP)

(73) Assignees: Sumitomo Electric Industries, Ltd., Osaka (JP); A.L.M.T. Corp., Tokyo (JP)

(*) Notice: Subject to any disclaimer, the term of this patent is extended or adjusted under 35 U.S.C. 154(b) by 0 days.

(21) Appl. No.: 15/772,582

(22) PCT Filed: Oct. 21, 2016

(86) PCT No.: PCT/JP2016/081311
§ 371 (c)(1),
(2) Date: May 1, 2018

(87) PCT Pub. No.: WO2017/077885
PCT Pub. Date: May 11, 2017

(65) Prior Publication Data
US 2019/0092638 A1    Mar. 28, 2019

(30) Foreign Application Priority Data
Nov. 2, 2015    (JP) .................. 2015-215721

(51) Int. Cl.
*C01B 21/082*    (2006.01)
*C22C 1/05*    (2006.01)
*C22C 29/04*    (2006.01)

(52) U.S. Cl.
CPC .......... *C01B 21/0828* (2013.01); *C22C 1/051* (2013.01); *C22C 29/04* (2013.01);
(Continued)

(58) Field of Classification Search
None
See application file for complete search history.

(56) References Cited

U.S. PATENT DOCUMENTS 5,166,103 A    11/1992   Krstic
7,625,421 B2   12/2009   Kahn et al.
(Continued)

FOREIGN PATENT DOCUMENTS

JP    57-027913 A    2/1982
JP    58-036914 A    3/1983
(Continued)

OTHER PUBLICATIONS

Zhilyaev V A et al., "Influence of Alloying Titanium Carbonitride by Transition Metals of Groups IV-VI on the Interaction with the Nickel Melt" Russian Journal of Non-Ferrous Metals, vol. 57, No. 2, 2014, pp. 141-147 [Cited in EESR dated Apr. 4, 2019 in the counterpart EP Application No. 16861948].
(Continued)

*Primary Examiner* — Guinever S Gregorio
(74) *Attorney, Agent, or Firm* — Baker Botts L.L.P.; Michael A. Sartori

(57) ABSTRACT

A complex carbonitride powder contains Ti as a main component element and at least one additional element selected from the group consisting of Zr, Hf, V, Nb, Ta, Cr, Mo, W, Al, and Si. The complex carbonitride powder includes a plurality of complex carbonitride particles containing Ti and the additional element. The plurality of complex carbonitride particles include a plurality of homogeneous composition particles where average concentrations
(Continued)

of Ti and the additional element in each complex carbonitride particle have a difference in a range of greater than or equal to −5 atom % and less than or equal to 5 atom % from average concentrations of Ti and the additional element in the whole complex carbonitride powder. A cross-sectional area of the homogeneous composition particles is greater than or equal to 90% of a cross-sectional area of the complex carbonitride particles $1p$.

2 Claims, 6 Drawing Sheets

(52) U.S. Cl.
CPC ....... *B22F 2998/00* (2013.01); *B22F 2999/00* (2013.01); *C01P 2004/03* (2013.01); *C01P 2004/61* (2013.01); *C01P 2004/62* (2013.01)

(56) References Cited

U.S. PATENT DOCUMENTS

| | | |
|---|---|---|
| 2010/0267542 A1 | 10/2010 | Kang |
| 2011/0117368 A1 | 5/2011 | Matsubara et al. |
| 2018/0036806 A1* | 2/2018 | Michiuchi ............... C22C 29/04 |

FOREIGN PATENT DOCUMENTS

| | | |
|---|---|---|
| JP | S58-144436 A | 8/1983 |
| JP | S58-213618 A | 12/1983 |
| JP | 61-106406 A | 5/1986 |
| JP | 64-045701 A | 2/1989 |
| JP | 64-045702 A | 2/1989 |
| JP | 64-045703 A | 2/1989 |
| JP | 64-045704 A | 2/1989 |
| JP | 02-190438 A | 7/1990 |
| JP | 2003-027114 A | 1/2003 |
| JP | 2004-292842 A | 10/2004 |
| JP | 2006-131975 A | 5/2006 |
| KR | 2000-0070755 A | 11/2000 |
| WO | 9834874 A1 | 8/1998 |
| WO | 2010/008004 A1 | 1/2010 |

OTHER PUBLICATIONS

Extended European Search Report dated Apr. 4, 2019 in counterpart EP Application No. 16861948.
Office Action dated Apr. 17, 2019 in the counterpart CA Patent Application No. 3,003,856.
Office Action dated Jun. 20, 2019 in counterpart Korean Application No. 10-2018-7012197.
Office Action issued in counterpart Canadian Patent Application No. 3,003,856, dated Jan. 21, 2020.

* cited by examiner

COMPLEX CARBONITRIDE POWDER AND METHOD FOR PRODUCING SAME

TECHNICAL FIELD

The present invention relates to a complex carbonitride powder and a method for producing the complex carbonitride powder. The present application claims priority based on Japanese Patent Application No. 2015-215721 filed on Nov. 2, 2015 and all the contents described in the Japanese application are incorporated herein by reference.

BACKGROUND ART

A cermet that is a hard alloy containing Ti as a main component element is excellent in wear resistance and therefore has been suitably used for, for example, cutting tools and wear resistance tools.

Japanese Patent Laying-Open No. 02-190438 (PTD 1) discloses a cermet for tools that includes 70 to 95 vol % of a hard dispersed phase and 5 to 30 vol % of a binder phase containing at least one iron group metal and that includes, as a composition structure, single phase particles, i.e., I particles, and II particles having a core portion and a peripheral portion.

Japanese Patent Laying-Open No. 2004-292842 (PTD 2) discloses a cermet that includes a hard phase and a binder phase, the hard phase including a first hard phase that has a core portion of titanium carbonitride and a peripheral portion of a complex carbonitride solid solution of at least one metal other than titanium and titanium, and a second hard phase containing a complex carbonitride solid solution of at least one metal other than titanium and titanium.

Japanese Patent Laying-Open No. 2006-131975 (PTD 3) discloses a cermet for saw blades that includes a binder phase containing iron group metals, mainly Co and Ni, and a hard phase mainly containing a carbonitride of essential Ti and W and at least one other metal component, the hard phase having a core structure that includes a black core particle and a peripheral component.

WO 2010/008004 A (PTD 4) discloses a hard powder containing greater than or equal to 90 vol % of a complex carbonitride solid solution represented by $(Ti_{1-x}, M_x)(C_{1-y}, N_y)$, a method for producing the hard powder, and a sintered hard alloy consisting of a hard phase that contains the complex carbonitride solid solution represented by $(Ti_{1-x}, M_x)(C_{1-y}, N_y)$ in an amount of greater than or equal to 90 vol % of the whole hard phase, and a binder phase.

CITATION LIST

Patent Document

PTD 1: Japanese Patent Laying-Open No. 02-190438
PTD 2: Japanese Patent Laying-Open No. 2004-292842
PTD 3: Japanese Patent Laying-Open No. 2006-131975
PTD 4: WO 2010/008004 A

SUMMARY OF INVENTION

A complex carbonitride powder according to the present disclosure contains titanium as a main component element and at least one additional element selected from the group consisting of zirconium, hafnium, vanadium, niobium, tantalum, chromium, molybdenum, tungsten, aluminum, and silicon. The complex carbonitride powder includes a plurality of complex carbonitride particles containing titanium and the additional element. The plurality of complex carbonitride particles include a plurality of homogeneous composition particles where average concentrations of titanium and the additional element in each complex carbonitride particle have a difference in a range of greater than or equal to −5 atom % and less than or equal to 5 atom % from average concentrations of titanium and the additional element in the whole complex carbonitride powder. A cross-sectional area of the homogeneous composition particles is greater than or equal to 90% of a cross-sectional area of the complex carbonitride particles, and the homogeneous composition particles are greater than or equal to 90% of the complex carbonitride particles in number.

A method for producing a complex carbonitride powder according to the present disclosure is a method for producing a complex carbonitride powder containing titanium as a main component element and at least one additional element selected from the group consisting of zirconium, hafnium, vanadium, niobium, tantalum, chromium, molybdenum, tungsten, aluminum, and silicon, the method including a mixing step of mixing an oxide powder containing titanium, an oxide powder containing the additional element, and a carbon source powder containing carbon to form a mixed powder; a granulating step of granulating the mixed powder to form granules; and a heat treatment step of subjecting the granules to a heat treatment at a temperature of greater than or equal to 1800° C. in a nitrogen-gas-containing nitrogen atmosphere gas to form a complex carbonitride powder.

DETAILED DESCRIPTION

Problem to be Solved by the Present Disclosure

All the cermets disclosed in Japanese Patent Laying-Open No. 02-190438 (PTD 1), Japanese Patent Laying-Open No. 2004-292842 (PTD 2), and Japanese Patent Laying-Open No. 2006-131975 (PTD 3) include a hard phase having a core structure that includes a core portion and a peripheral portion surrounding the core portion, resulting in different types of composition in the core portion and the peripheral portion, so that there has been a problem that it is difficult to increase the strength of the cermets.

WO 2010/0080004 A (PTD 4) describes that a complex carbonitride solid solution contained in a hard powder has uniform composition where metal elements contained in the complex carbonitride solid solution are each in the range of less than or equal to plus/minus 5 atom % from the average composition of each of the metal elements. The present inventors, however, have found through additional studies that such a hard powder includes, as at least a part of raw materials, a carbonitride containing Ti, and such a carbonitride containing Ti is chemically very stable and is therefore unlikely to be integrated with another raw material even when subjected to a heat treatment at a high temperature of 2200° C., providing a large amount of residual unreacted carbonitrides containing Ti that act as a nucleus of dissolution and reprecipitation during sintering, to end up forming a hard phase having a core structure. That is, WO 2010/0080004 A (PTD 4) has also had a problem that it is difficult to increase the strength of a sintered hard alloy obtained from the hard powder disclosed in the patent document.

Thus, an object of the present invention is to solve the problems and provide a complex carbonitride powder having homogeneous composition and a method for producing the complex carbonitride powder.

Advantageous Effect of the Present Disclosure

According to the object, there can be provided a complex carbonitride powder having homogeneous composition and a method for producing the complex carbonitride powder.

DESCRIPTION OF EMBODIMENTS

Figure 1:
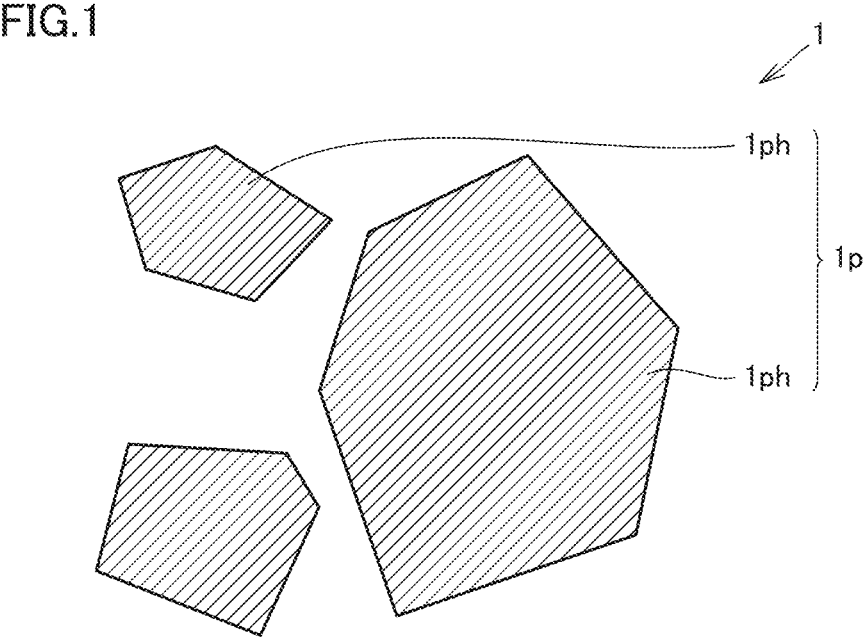
FIG. 1 is a schematic view illustrating one example of a cross-sectional structure of a complex carbonitride powder according to an aspect of the present invention.

As illustrated in FIG. 1, a complex carbonitride powder 1 according to an embodiment of the present invention contains titanium as a main component element and at least one additional element selected from the group consisting of zirconium, hafnium, vanadium, niobium, tantalum, chromium, molybdenum, tungsten, aluminum, and silicon. Complex carbonitride powder 1 includes a plurality of complex carbonitride particles 1p containing titanium and the additional element. The plurality of complex carbonitride particles 1p include a plurality of homogeneous composition particles 1ph where average concentrations of titanium and the additional element in each complex carbonitride particle 1p have a difference in a range of greater than or equal to −5 atom % and less than or equal to 5 atom % from average concentrations of titanium and the additional element in whole complex carbonitride powder 1. A cross-sectional area of homogeneous composition particles 1ph is greater than or equal to 90% of a cross-sectional area of complex carbonitride particles 1p, and homogeneous composition particles 1ph are greater than or equal to 90% of complex carbonitride particles 1p in number.

Many of the plurality of complex carbonitride particles 1p included in complex carbonitride powder 1 according to the present embodiment are homogeneous composition particles that are uniform and have little variation in composition of titanium and the additional element in the particles, so that it is possible to produce a hard alloy that includes homogeneous complex carbonitride phases and is high in both hardness and fracture toughness.

In homogeneous composition particles 1ph of complex carbonitride powder 1 according to the present embodiment, concentration distributions of titanium and the additional element in each of homogeneous composition particles 1ph can be set to a range of greater than or equal to −5 atom % and less than or equal to 5 atom % from the average concentrations of titanium and the additional element in whole complex carbonitride powder 1. Such complex carbonitride powder 1 can produce a hard alloy that includes homogeneous complex carbonitride phases and is high in both hardness and fracture toughness.

Figure 2:
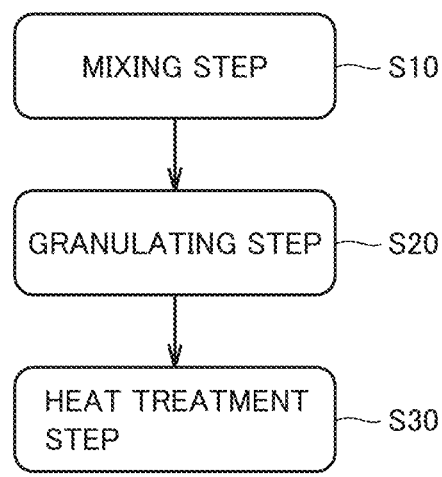
FIG. 2 is a flow chart illustrating one example of a method for producing a complex carbonitride powder according to another aspect of the present invention.
Figure 3:
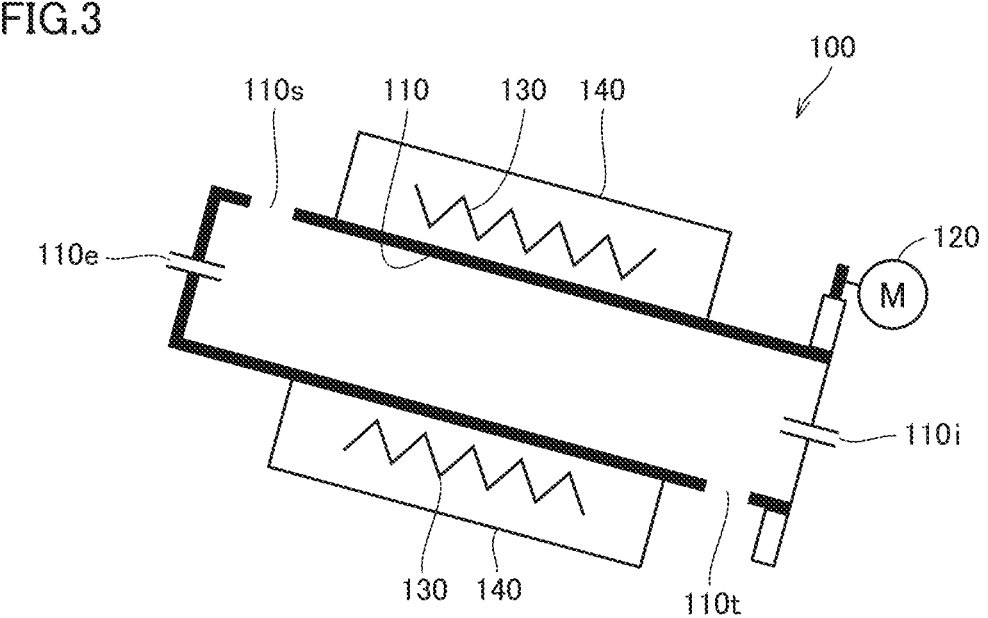
FIG. 3 is a schematic view illustrating one example of a heat treatment device used in the method for producing a complex carbonitride powder according to the aspect of the present invention.

As illustrated in FIGS. 1 to 3, a method for producing complex carbonitride powder 1 according to another embodiment of the present invention is a method for producing complex carbonitride powder 1 containing titanium as a main component element and at least one additional element selected from the group consisting of zirconium, hafnium, vanadium, niobium, tantalum, chromium, molybdenum, tungsten, aluminum, and silicon. The method for producing complex carbonitride powder 1 includes a mixing step S10 of mixing a titanium-containing oxide powder, an additional-element-containing oxide powder, and a carbon-containing carbon source powder to form a mixed powder; a granulating step S20 of granulating the mixed powder to form granules; and a heat treatment step S30 of subjecting the granules to a heat treatment at a temperature of greater than or equal to 1800° C. in a nitrogen-gas-containing nitrogen atmosphere gas to form complex carbonitride powder 1.

In the method for producing complex carbonitride powder 1 according to the present embodiment, the titanium-containing oxide powder, the additional-element-containing oxide powder, and the carbon-containing carbon source powder are used as starting raw materials to substantially simultaneously and continuously cause, in the heat treatment step, a reduction reaction, a solid solution reaction, and a carbonitriding reaction of the starting raw materials, in particular, to remarkably promote the solid solution reaction by retention of active titanium and additional element immediately after reduction, so that complex carbonitride powder 1 according to Embodiment 1 can be obtained that includes complex carbonitride particles 1p including many homogeneous composition particles 1ph homogeneous in composition in the particles.

In heat treatment step S30 of the method for producing complex carbonitride powder 1 according to the present embodiment, an inclined rotary reaction tube 110 is heated to greater than or equal to 1800° C., the granules are continuously supplied from an upper portion of rotary reaction tube 110 while a nitrogen atmosphere gas is flown through rotary reaction tube 110, and rotary reaction tube 110 is rotated, to perform a heat treatment while the granules move in rotary reaction tube 110, so that complex carbonitride powder 1 is formed and can be extracted from a lower portion of rotary reaction tube 110. Such a method for producing complex carbonitride powder 1 can continuously and efficiently give stable-quality complex carbonitride powder 1 according to Embodiment 1 that includes complex carbonitride particles 1p including many homogeneous composition particles 1ph homogeneous in composition in the particles.

In the mixing step of the method for producing complex carbonitride powder 1 according to the present embodiment, the mixed powder can be set to have a median particle diameter D50 of less than or equal to 0.5 μm. Such a method for producing complex carbonitride powder 1 easily homogenizes the composition of complex carbonitride particle 1p in complex carbonitride powder 1.

In the method for producing complex carbonitride powder 1 according to the present embodiment, at least a part of the titanium-containing oxide powder and the additional-element-containing oxide powder can be a complex oxide powder containing titanium and the additional element. Such a method for producing complex carbonitride powder 1 can homogenize the composition of complex carbonitride particle 1p while keeping small the median particle diameter D50 of complex carbonitride particles 1p in complex carbonitride powder 1.

Figure 4:
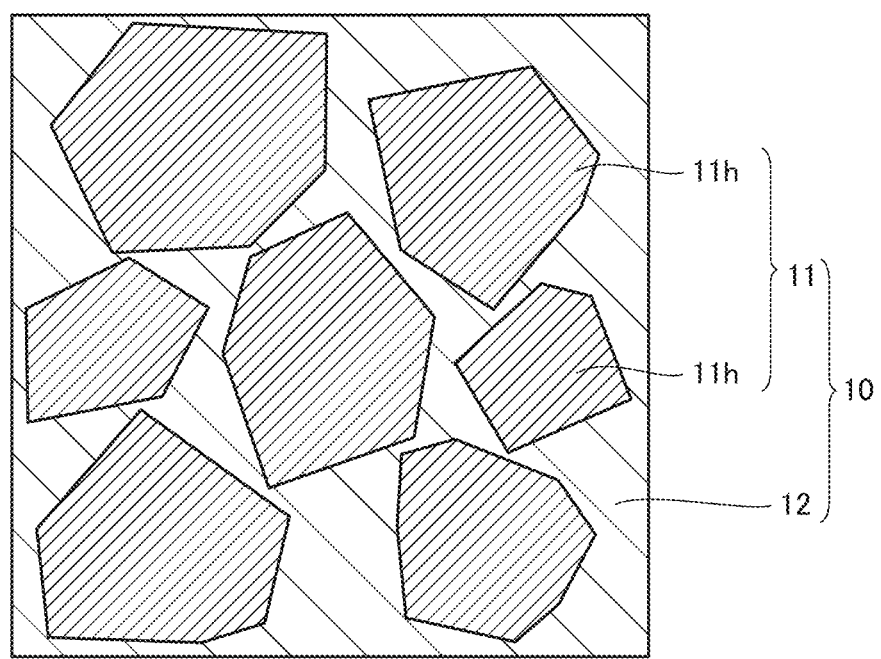
FIG. 4 is a schematic view illustrating one example of a cross-sectional structure of a hard alloy produced with use of a complex carbonitride powder according to an aspect of the present invention.

As illustrated in FIG. 4, a hard alloy 10 produced with use of complex carbonitride powder 1 according to the above-mentioned embodiment of the present invention includes a plurality of complex carbonitride hard phases 11 that contain titanium as a main component element and at least one additional element selected from the group consisting of zirconium, hafnium, vanadium, niobium, tantalum, chromium, molybdenum, tungsten, aluminum, and silicon, and a metal binder phase 12 containing an iron group element as a main component element. The plurality of complex carbonitride hard phases 11 include a plurality of homogeneous composition hard phases 11h where average concentrations of titanium and the additional element in each complex carbonitride hard phase 11 have a difference in a range of greater than or equal to −5 atom % and less than or equal to 5 atom % from average concentrations of titanium and the additional element in all complex carbonitride hard phases 11. A cross-sectional area of homogeneous composition hard phases 11h is greater than or equal to 80% of a cross-sectional area of complex carbonitride hard phases 11, and homogeneous composition hard phases 11h are greater than or equal to 80% of complex carbonitride hard phases 11 in number.

Many of complex carbonitride hard phases 11 included in hard alloy 10 are homogeneous composition hard phases that are uniform and have little variation in composition of titanium and the additional element in the phases, so that the hard alloy is high in both hardness and fracture toughness.

DETAIL OF EMBODIMENTS OF INVENTION

Embodiment 1: Complex Carbonitride Powder

As illustrated in FIG. 1, a complex carbonitride powder 1 according to Embodiment 1 contains titanium (Ti) as a main component element and at least one additional element selected from the group consisting of zirconium (Zr), hafnium (Hf), vanadium (V), niobium (Nb), tantalum (Ta), chromium (Cr), molybdenum (Mo), tungsten (W), aluminum (Al), and silicon (Si). Complex carbonitride powder 1 includes a plurality of complex carbonitride particles 1p containing titanium (Ti) and the additional element. The plurality of complex carbonitride particles 1p include a plurality of homogeneous composition particles 1ph where average concentrations $C\alpha_{Ti}$ and $C\alpha_A$ (atom %) of Ti and the additional element in each complex carbonitride particle 1p have differences $C\alpha_{Ti}-C\alpha_{Ti0}$ and $C\alpha_A-C\alpha_{A0}$ (atom %) in a range of greater than or equal to −5 atom % and less than or equal to 5 atom % from average concentrations of titanium (Ti) and the additional element in whole complex carbonitride powder 1. A cross-sectional area of homogeneous composition particles 1ph is greater than or equal to 90% of a cross-sectional area of complex carbonitride particles 1p, and homogeneous composition particles 1ph are greater than or equal to 90% of complex carbonitride particles 1p in number.

Many of the plurality of complex carbonitride particles 1p included in complex carbonitride powder 1 according to the present embodiment are homogeneous composition particles that are uniform and have little variation in composition of Ti and the additional element in the particles, so that it is possible to produce a hard alloy that includes homogeneous complex carbonitride phases and is high in both hardness and fracture toughness.

Ti contained in complex carbonitride powder 1 is a main component element, and the average concentration of Ti is greater than 50 atom % relative to the total of Ti and the additional element. Further, the average concentration of Ti is preferably greater than or equal to 60 atom % and less than or equal to 95 atom %, more preferably greater than or equal to 75 atom % and less than or equal to 90 atom %, from the viewpoint that the addition amount of the additional element is set to less than or equal to a solid solubility limit and an effect of the additional element is sufficiently drawn.

The additional element contained in complex carbonitride powder 1 is at least one element selected from the group consisting of Zr, Hf, V, Nb, Ta, Cr, Mo, W, Al, and Si, and the average concentration of the additional element is less than 50 atom % relative to the total of Ti and the additional element. The average concentration of the additional element is preferably greater than or equal to 5 atom % and less than or equal to 40 atom %, more preferably greater than or equal to 10 atom % and less than or equal to 25 atom %, from the viewpoint that an effect of the additional element is sufficiently drawn and the addition amount of the additional element is set to less than or equal to a solid solubility limit.

Here, the identification of Ti and a type of the additional element in complex carbonitride powder 1 and complex carbonitride particles 1p and the measurement of the average concentrations of these elements are performed for a wrapped cut surface obtained by embedding complex carbonitride powder 1 in a resin, cutting the complex carbonitride powder together with the resin along any specified surface, and wrapping the cut surface, by SEM (scanning electron microscope)/EDX (energy dispersive X-ray spectroscopy) and/or EPMA (electron probe microanalyzer). Suitable examples of the resin for embedding complex carbonitride powder 1 therein include an epoxy resin, a polyester resin, a phenol resin, and an acrylic resin. In an SEM composition image of the cut surface of complex carbonitride powder 1, complex carbonitride particle 1p having clear contrast in the particle is understood not to be a homogeneous composition particle without the analyses described above.

Complex carbonitride particles 1p included in complex carbonitride powder 1 contain Ti and the additional element. Complex carbonitride particles 1p include the plurality of homogeneous composition particles 1ph where average concentrations $C\alpha_{Ti}$ and $C\alpha_A$ (atom %) of Ti and the additional element in each complex carbonitride particle 1p have differences $C\alpha_{Ti}-C\alpha_{Ti0}$ and $C\alpha_A-C\alpha_{AO}$ (atom %) in a range of greater than or equal to −5 atom % and less than or equal to 5 atom % from average concentrations $C\alpha_{Ti0}$ and $C\alpha_{AO}$ (atom %) of Ti and the additional element in whole complex carbonitride powder 1, from the viewpoint that the composition of Ti and the additional element is made uniform and small in variation (specifically to homogenize the composition) in complex carbonitride particles 1p. From the viewpoint described above, at least one of the differences $C\alpha_{Ti}$-$C\alpha_{Ti0}$ and $C\alpha_A$-$C\alpha_{AO}$ is preferably greater than or equal to −3 atom % and less than or equal to 3 atom %.

In complex carbonitride powder 1, the cross-sectional area of homogeneous composition particles 1ph is greater than or equal to 90% of the cross-sectional area of complex carbonitride particles 1p, and homogeneous composition particles 1ph are greater than or equal to 90% of complex carbonitride particles 1p in number, from the viewpoint that the composition of Ti and the additional element is made uniform and small in variation (specifically to homogenize the composition) in complex carbonitride particles 1p. From the viewpoint described above, the cross-sectional area of homogeneous composition particles 1ph is preferably greater than or equal to 92%, more preferably greater than or equal to 94% of the cross-sectional area of complex carbonitride particles 1p. In addition, homogeneous composition particles 1ph are preferably greater than or equal to 92%, more preferably greater than or equal to 94% of complex carbonitride particles 1p in number.

In homogeneous composition particles 1ph of complex carbonitride powder 1 according to the present embodiment, concentration distributions of titanium and the additional element in each of homogeneous composition particles 1ph are preferably in a range of greater than or equal to −5 atom % and less than or equal to 5 atom %, more preferably greater than or equal to −3 atom % and less than or equal to 3 atom % from the average concentrations of titanium and the additional element in whole complex carbonitride powder 1. Such complex carbonitride powder 1 can produce a hard alloy that includes homogeneous complex carbonitride phases and is high in both hardness and fracture toughness.

Here, as for homogeneous composition particles 1ph, the phrase "a concentration distribution of titanium in each of homogeneous composition particles 1ph is in a range of greater than or equal to −5 atom % and less than or equal to 5 atom % or in a range of greater than or equal to −3 atom % and less than or equal to 3 atom % from the average concentration of titanium in whole complex carbonitride powder 1" refers to that, as for a minimum concentration $C\alpha_{Ti\text{-}Min}$ (atom %) and a maximum concentration $C\alpha_{Ti\text{-}Max}$ (atom %) of titanium in each of homogeneous composition particles 1ph and the average concentration $C\alpha_{Ti0}$ (atom %) of titanium in whole complex carbonitride powder 1, $C\alpha_{Ti\text{-}Min}$-$C\alpha_{Ti0}$ is greater than or equal to −5 atom % and $C\alpha_{Ti\text{-}Max}$-$C\alpha_{Ti0}$ is less than or equal to 5 atom %, or $C\alpha_{Ti\text{-}Min}$-$C\alpha_{Ti0}$ is greater than or equal to −3 atom % and $C\alpha_{Ti\text{-}Max}$-$C\alpha_{Ti0}$ is less than or equal to 3 atom %.

Here, as for homogeneous composition particles 1ph, the phrase "a concentration distribution of the additional element in each of homogeneous composition particles 1ph is in a range of greater than or equal to −5 atom % and less than or equal to 5 atom % or in a range of greater than or equal to −3 atom % and less than or equal to 3 atom % from the average concentration of the additional element in whole complex carbonitride powder 1" refers to that, as for a minimum concentration $C\alpha_{A\text{-}Min}$ (atom %) and a maximum concentration $C\alpha_{A\text{-}Max}$ (atom %) of the additional element in each of homogeneous composition particles 1ph and the average concentration $C\alpha_{AO}$ (atom %) of the additional element in whole complex carbonitride powder 1, $C\alpha_{A\text{-}Min}$-$C\alpha_{AO}$ is greater than or equal to −5 atom % and $C\alpha_{A\text{-}Max}$-$C\alpha_{AO}$ is less than or equal to 5 atom %, or $C\alpha_{A\text{-}Min}$-$C\alpha_{AO}$ is greater than or equal to −3 atom % and $C\alpha_{A\text{-}Max}$-$C\alpha_{AO}$ is less than or equal to 3 atom %.

A median particle diameter D50 of complex carbonitride particles 1p is preferably greater than or equal to 0.3 μm and less than or equal to 5.0 μm from the viewpoint that the volume of the powder is reduced for easy handling and excessive pulverization of the powder that is used as a raw material powder of a hard alloy is made unnecessary, and further, the median particle diameter D50 is more preferably greater than or equal to 0.5 μm and less than or equal to 3.0 μm from the viewpoint of improving both the hardness and the fracture toughness of a cutting tool. The median particle diameter D50 of complex carbonitride particles 1p can be adjusted to a predetermined size by normal pulverization and classification of complex carbonitride powder 1. Here, the median particle diameter D50 of complex carbonitride particles 1p is calculated from a volume-based cumulative particle size distribution of particles measured by a laser diffraction particle size distribution analyzer.

Embodiment 2: Method for Producing Complex Carbonitride Powder

As illustrated in FIGS. 1 to 3, a method for producing complex carbonitride powder 1 according to Embodiment 2 is a method for producing complex carbonitride powder 1 according to Embodiment 1 that contains titanium (Ti) as a main component element and at least one additional element selected from the group consisting of zirconium (Zr), hafnium (Hf), vanadium (V), niobium (Nb), tantalum (Ta), chromium (Cr), molybdenum (Mo), tungsten (W), aluminum (Al), and silicon (Si). The method for producing complex carbonitride powder 1 according to the present embodiment includes a mixing step S10 of mixing a titanium (Ti)-containing oxide powder, an additional-element-containing oxide powder, and a carbon (C)-containing carbon source powder to form a mixed powder; a granulating step S20 of granulating the mixed powder to form granules; and a heat treatment step S30 of subjecting the granules to a heat treatment at a temperature of greater than or equal to 1800° C. in a nitrogen-gas-containing nitrogen atmosphere gas to form complex carbonitride powder 1.

In the method for producing complex carbonitride powder 1 according to the present embodiment, the Ti-containing oxide powder, the additional-element-containing oxide powder, and the C-containing carbon source powder are used as starting raw materials to substantially simultaneously and continuously cause, in the heat treatment step, a reduction reaction of the oxide powders, a solid solution reaction resulting from mutual dispersion between active Ti and additional element of the reduced oxide powders, and a carbonitriding reaction of the powders that have been made into a solid solution, in particular, to remarkably promote the solid solution reaction by retention of the active Ti and additional element immediately after reduction, so that complex carbonitride powder 1 according to Embodiment 1 can be obtained that includes complex carbonitride particles 1p including homogeneous composition particles 1ph homogeneous in composition in the particles.

(Mixing Step)

In mixing step S10 illustrated in FIG. 2, the starting raw materials, i.e., the Ti-containing oxide powder, the additional-element-containing oxide powder, and the C-containing carbon source powder are mixed to form a mixed powder. The Ti-containing oxide is not particularly limited, and examples thereof include $TiO_2$. A crystal structure of $TiO_2$ is not particularly limited and may be any of a rutile type, an anatase type, and a brookite type. The additional-element-containing oxide is not particularly limited, and examples thereof include oxide powders of Zr, Hf, V, Nb, Ta, Cr, Mo, W, Al, and Si, namely, $ZrO_2$, $HfO_2$, $V_2O_5$, $Nb_2Os$, $Ta_2Os$, $Cr_2O_3$, $MoO_3$, $WO_3$, $Al_2O_3$, and $SiO_2$, respectively. Here, the oxidation number of each element and a content of impurities can be changed as long as the change is not against the object. The C-containing carbon source is not particularly limited, and graphite and polysaccharides can be also used, for example.

Here, at least a part of the Ti-containing oxide and the additional-element-containing oxide is preferably a complex oxide containing Ti and the additional element. As described later, it is possible to homogenize the composition of complex carbonitride particle $1p$ while keeping small the median particle diameter D50 of complex carbonitride particles $1p$ in complex carbonitride powder 1. The complex oxide containing Ti and the additional element is not particularly limited, and examples thereof include $Ti_{0.9}Zr_{0.1}O_2$ and $Ti_{0.9}W_{0.1}O_2$.

The method of mixing the starting raw materials is not particularly limited. Suitable examples of the method, however, include mixing by a dry ball mill and mixing by a wet ball mill that have a high pulverization action, from the viewpoint of reducing the median particle diameter D50 of the mixed powder (referring to the powder obtained through mixture of powders, the same applies hereinafter). Alternatively, mixing with use of, for example, a rotary blade fluidized mixer having a low pulverization action can be applied if primary particles of the starting raw materials have a median particle diameter D50 of less than or equal to 0.5 µm and aggregation of secondary particles is weak.

The median particle diameter D50 of the mixed powder obtained as described above is preferably greater than or equal to 0.1 µm and less than or equal to 0.5 µm, from the viewpoint of easily homogenizing the composition of complex carbonitride particle $1p$ in complex carbonitride powder 1 and preventing excessive aggregation of a granulated and heat-treated powder described later. Here, the median particle diameter D50 of the mixed powder is measured by calculating, with image analysis software, an equivalent circle diameter from an external observation image obtained by an SEM (scanning electron microscope).

(Granulating Step)

In granulating step S20 illustrated in FIG. 2, the mixed powder is granulated to form granules. Such a step can simplify the following heat treatment step and handleability afterward. The granulating method is not particularly limited, and applicable examples of the method include use of known devices such as a spray drier and an extrusion granulation machine. In granulation, binder components such as a wax material may be appropriately used as a binder material. The shape and dimension of the granules are not particularly limited. The granules can be made as a circular column shape having a diameter of 0.5 mm to 5.0 mm and a length of about 5 mm to 20 mm.

(Heat Treatment Step)

In heat treatment step S30 illustrated in FIG. 2, the granules are subjected to a heat treatment at a temperature of greater than or equal to 1800° C. in a nitrogen-gas-containing nitrogen atmosphere gas to form complex carbonitride powder 1.

In heat treatment step S30, when the granules are subjected to a heat treatment, oxygen (O) in the Ti-containing oxide powder and the additional-element-containing oxide powder (including the cases where at least a part of the oxide powders is a complex oxide powder containing Ti and the additional element) first reacts with carbon (C) in the carbon source powder to cause a reduction reaction where the oxide powders are reduced to provide Ti and the additional element. Ti and the additional element in the oxide powders, which have been provided through the reduction, are in a state of being likely to cause a solid solution reaction where Ti and the additional element are made into a solid solution by mutual dispersion. Ti and the additional element in the oxide powders, which have been provided through the reduction, cause a carbonitriding reaction of reacting with nitrogen (N) in the nitrogen atmosphere gas and carbon (C) in the carbon source powder almost at the same time as the solid solution reaction proceeds, to form complex carbonitride powder 1 that includes complex carbonitride particles $1p$ including homogeneous composition particles that contain Ti and the additional element in homogeneous composition. The median particle diameter D50 of complex carbonitride particles $1p$ in complex carbonitride powder 1 can be adjusted to a predetermined size by normal pulverization and classification of heat-treated complex carbonitride powder 1.

Here, at least a part of the Ti-containing oxide and the additional-element-containing oxide is preferably a complex oxide containing Ti and the additional element, form the viewpoint of homogenizing the composition of complex carbonitride particle $1p$ while keeping small the median particle diameter D50 of complex carbonitride particles $1p$ in complex carbonitride powder 1. Only a mixed oxide powder that contains an oxide powder containing only Ti and an oxide powder containing only the additional element requires mutual adhesion of particles of the powders to promote the solid solution reaction and increases the median particle diameter D50 of complex carbonitride particles $1p$ in complex carbonitride powder 1 obtained, giving an disadvantage for forming a hard alloy that includes, in complex carbonitride hard phases, many homogeneous composition hard phases having homogenized composition.

As described above, in the method for producing complex carbonitride powder 1 according to the present embodiment, the oxide powders (that is, the Ti-containing oxide powder and the additional-element-containing oxide powder (including the cases where at least a part of the oxide powders is a complex oxide powder containing Ti and the additional element)) and the carbon source powder are used as starting raw materials to substantially simultaneously and continuously cause, by the heat treatment, a reduction reaction, a solid solution reaction, and a carbonitriding reaction of the starting raw materials, in particular, to remarkably promote the solid solution reaction by retention of active Ti and additional element immediately after reduction, so that complex carbonitride powder 1 obtained includes complex carbonitride particles $1p$ including many homogeneous composition particles $1ph$ homogeneous in composition in the particles.

On the other hand, the use of metal powders (specifically, a Ti-containing metal powder and an additional-element-containing metal powder) or carbonitride powders (specifically, a Ti-containing carbonitride powder and an additional-element-containing carbonitride powder) as starting raw materials cannot give a complex carbonitride powder that includes complex carbonitride particles including many homogeneous composition particles homogeneous in composition in the particles. The reason why such a complex carbonitride powder cannot be obtained when the metal powders are used as starting raw materials is that the heat treatment causes the carbonitriding reaction earlier, so that the solid solution reaction resulting from mutual dispersion between Ti and the additional element does not proceed. The reason why such a complex carbonitride powder cannot be obtained when the carbonitride powders are used as starting raw materials is that the carbonitride powders (particularly, the Ti-containing carbonitride powder) are chemically stable even in a high temperature range exceeding 2000° C., so that the solid solution reaction resulting from mutual dispersion between Ti and the additional element does not proceed.

The atmosphere in the heat treatment of heat treatment step S30 is a nitrogen gas ($N_2$ gas)-containing nitrogen atmosphere gas, from the viewpoint of forming the carbonitride powders from the oxide powders together with the carbon source powder. The nitrogen atmosphere gas may be a pure $N_2$ gas or a mixed gas obtained by mixing a $N_2$ gas with a hydrogen gas ($H_2$ gas), an argon gas (Ar gas), a helium gas (He gas), or a carbon monoxide gas (CO gas).

A temperature in the heat treatment of heat treatment step S30 is greater than or equal to 1800° C., preferably greater than or equal to 2000° C., from the viewpoint of allowing the reduction reaction, the solid solution reaction, and the carbonitriding reaction of the oxide powders to proceed and promoting these reactions. In particular, the temperature needs to be greater than or equal to 1800° C. from the viewpoint of sufficiently reducing, forming a solid solution from, and carbonitriding the Ti-containing oxide powder, and the temperature is preferably greater than or equal to 2000° C. from the viewpoint of sufficiently reducing, forming a solid solution from, and carbonitriding an oxide powder containing Al, Zr, and/or Hf as the additional element. In addition, the temperature is preferably less than or equal to 2400° C. from the viewpoint of preventing excessive aggregation of a heat-treated powder.

A heat treatment time in heat treatment step S30 varies according to the median particle diameter D50 of the mixed powder of the oxide powders and the carbon source powder as starting raw materials. For example, when the median particle diameter D50 of the mixed powder is about 0.3 μm to 0.5 μm, the time is suitably about 15 minutes to 60 minutes.

Referring to FIGS. 2 and 3, in the method for producing complex carbonitride powder 1 according to the present embodiment, a rotary continuous heat treatment device 100 such as a rotary kiln is used in heat treatment step S30. An inclined rotary reaction tube 110 is heated to greater than or equal to 1800° C., the granules are continuously supplied from an upper portion of rotary reaction tube 110 while a nitrogen atmosphere gas is flown through rotary reaction tube 110, and rotary reaction tube 110 is rotated, to perform a heat treatment while the granules move in rotary reaction tube 110, so that complex carbonitride powder 1 is formed and can be extracted from a lower portion of rotary reaction tube 110. Such a method for producing complex carbonitride powder 1 can continuously and efficiently give stable-quality complex carbonitride powder 1 according to Embodiment 1 that includes complex carbonitride particles 1p including many homogeneous composition particles 1ph homogeneous in composition in the particles.

Heat treatment device 100 illustrated in FIG. 3 includes rotary reaction tube 110 that rotates around a long axis and is cylindrical; a rotary mechanism 120 for rotating rotary reaction tube 110; a heating mechanism 130 for heating rotary reaction tube 110; and a casing 140 that stores the heating mechanism. Rotary reaction tube 110 is provided with a gas inlet 110i for introducing the nitrogen atmosphere gas into rotary reaction tube 110; a gas outlet 110e for discharging the nitrogen atmosphere gas from rotary reaction tube 110; a raw material inlet 110s for charging the starting raw materials into rotary reaction tube 110; and a heat-treated product outlet 110t for extracting the complex carbonitride powder as a heat-treated product from rotary reaction tube 110. Rotary reaction tube 110 rotates around the long axis.

In heat treatment device 100 illustrated in FIG. 3, gas inlet 110i is provided in the lower portion of rotary reaction tube 110 while gas outlet 110e is provided in the upper portion of rotary reaction tube 110 to give a configuration where the nitrogen atmosphere gas passes from the lower portion toward the upper portion of rotary reaction tube 110. The configuration, however, may be the other way around so that the nitrogen atmosphere gas passes from the upper portion toward the lower portion of rotary reaction tube 110.

In heat treatment step S30, heat treatment device 100 illustrated in FIG. 3 operates as follows. Rotary reaction tube 110 is heated in advance to greater than or equal to 1800° C. by heating mechanism 130 of heat treatment device 100, while the nitrogen atmosphere gas is introduced into rotary reaction tube 110 from gas inlet 110i. Rotary reaction tube 110 is heated to a predetermined heat treatment temperature of greater than or equal to 1800° C., and then the granules are supplied from raw material inlet 110s into rotary reaction tube 110 while rotary reaction tube 110 is rotated by rotary mechanism 120. The granules that have been supplied into rotary reaction tube 110 move from the upper portion toward the lower portion of rotary reaction tube 110 in rotary reaction tube 110 by rotation of rotary reaction tube 110 while heated to the above-mentioned heat treatment temperature by heat transferred from an inner wall of rotary reaction tube 110 and radiant heat.

In the granules that have been heated to a heat treatment temperature of greater than or equal to 1800° C. occurs a reduction reaction of the oxide powders (the Ti-containing oxide powder and the additional-element-containing oxide powder (including the cases where at least a part of the oxide powders is a complex oxide powder containing Ti and the additional element)) in the granules. Active Ti and additional element in the oxide powders, which have been provided through the reduction, promote formation of a solid solution by mutual dispersion between Ti and the additional element. Further, Ti and the additional element react with nitrogen supplied from the gas inlet and C in the carbon source powder in the granules, so that a carbonitriding reaction proceeds almost at the same time as the formation of a solid solution. The thus carbonitrided granules reach the lower portion of rotary reaction tube 110 and are extracted from heat-treated product outlet 110t provided in the lower portion. The extracted granules are crushed and/or pulverized by a known pulverizing method appropriately selected by a person skilled in the art to give a complex carbonitride powder.

Heat treatment device 100 having the configuration described above can substantially fix heat treatment conditions (heat treatment atmosphere, heat treatment temperature, and heat treatment time) for granules to continuously and efficiently produce a complex carbonitride powder stable in quality.

{Hard Alloy}

As illustrated in FIG. 4, a hard alloy 10 produced with use of the complex carbonitride powder according to Embodiment 1 includes a plurality of complex carbonitride hard phases 11 that contain titanium (Ti) as a main component element and at least one additional element selected from the group consisting of zirconium (Zr), hafnium (Hf), vanadium (V), niobium (Nb), tantalum (Ta), chromium (Cr), molybdenum (Mo), tungsten (W), aluminum (Al), and silicon (Si), and a metal binder phase 12 containing an iron group element as a main component element. The plurality of complex carbonitride hard phases 11 include a plurality of homogeneous composition hard phases 11$h$ where average concentrations of titanium (Ti) and the additional element in each complex carbonitride hard phase 11 have a difference in a range of greater than or equal to −5 atom % and less than or equal to 5 atom % from average concentrations of titanium (Ti) and the additional element in all complex carbonitride hard phases 11. A cross-sectional area of homogeneous composition hard phases 11$h$ is greater than or equal to 80% of a cross-sectional area of complex carbonitride hard phases 11, and homogeneous composition hard phases 11$h$ are greater than or equal to 80% of complex carbonitride hard phases 11 in number.

Many of complex carbonitride hard phases 11 included in hard alloy 10 are homogeneous composition hard phases that are uniform and have little variation in composition of Ti and the additional element in the phases, so that the hard alloy is high in both hardness and fracture toughness.

Ti contained in complex carbonitride hard phases 11 is a main component element, and the average concentration of Ti is greater than 50 atom % relative to the total of Ti and the additional element. Further, the average concentration of Ti is preferably greater than or equal to 60 atom % and less than or equal to 95 atom %, more preferably greater than or equal to 75 atom % and less than or equal to 90 atom %, from the viewpoint that the addition amount of the additional element is set to less than or equal to a solid solubility limit and an effect of the additional element is sufficiently drawn.

The additional element contained in complex carbonitride hard phases 11 is at least one element selected from the group consisting of Zr, Hf, V, Nb, Ta, Cr, Mo, W, Al, and Si, and the average concentration of the additional element is less than 50 atom % relative to the total of Ti and the additional element. The average concentration of the additional element is preferably greater than or equal to 5 atom % and less than or equal to 40 atom %, more preferably greater than or equal to 10 atom % and less than or equal to 25 atom %, from the viewpoint that an effect of the additional element is sufficiently drawn and the addition amount of the additional element is set to less than or equal to a solid solubility limit.

Metal binder phase 12 contains the iron group element as a main component element and, in addition to the iron group element, an inevitable element mixed from the complex carbonitride hard phase (i.e., at least a part of the additional element) and a slight amount of an impurity element. An average concentration of the iron group element is preferably greater than or equal to 90 atom %, more preferably greater than or equal to 95 atom %, from the viewpoint that the iron group element keeps a state of a metal and formation of a brittle intermediate compound is avoided. Here, the iron group element refers to the elements of Groups 8, 9, and 10 in Period 4, i.e., iron (Fe), cobalt (Co), and nickel (Ni). Examples of the element other than the iron group element contained in metal binder phase 12 include titanium (Ti) and tungsten (W).

Here, the identification of Ti and a type of the additional element in complex carbonitride hard phases 11 and types of the iron group element and a metal element other than the iron group element in the metal binder phase and the measurement of the average concentrations of these elements are performed for a wrapped cut surface obtained by cutting hard alloy 10 along any specified surface and wrapping the cut surface, by SEM (scanning electron microscope)/EDX (energy dispersive X-ray spectroscopy) and/or EPMA (electron probe microanalyzer). In an SEM composition image of the cut surface of hard alloy 10, complex carbonitride hard phase 11 having clear contrast in the phase is understood not to be a homogeneous composition hard phase without the analyses described above.

The plurality of complex carbonitride hard phases 11 contain Ti and the additional element. The plurality of complex carbonitride hard phases 11 include the plurality of homogeneous composition hard phases 11$h$ where average concentrations $C\beta_{Ti}$ and $C\beta_A$ (atom %) of Ti and the additional element in each complex carbonitride hard phase 11 have differences $C\beta_{Ti}-C\beta_{Ti0}$ and $C\beta_A-C\beta_{AO}$ (atom %) in a range of greater than or equal to −5 atom % and less than or equal to 5 atom % from average concentrations $C\beta_{Ti0}$ and $C\beta_{AO}$ (atom %) of Ti and the additional element in all the plurality of complex carbonitride hard phases 11, from the viewpoint that the composition of Ti and the additional element is made uniform and small in variation (specifically to homogenize the composition) in complex carbonitride hard phases 11. From the viewpoint described above, at least one of the differences $C\beta_{Ti}-C\beta_{Ti0}$ and $C\beta_A-C\beta_{AO}$ is preferably greater than or equal to −3 atom % and less than or equal to 3 atom %.

In complex carbonitride hard phases 11, a cross-sectional area of homogeneous composition hard phases 11$h$ is greater than or equal to 80% of a cross-sectional area of complex carbonitride hard phases 11, and homogeneous composition hard phases 11$h$ are greater than or equal to 80% of complex carbonitride hard phases 11 in number, from the viewpoint that the composition of Ti and the additional element is made uniform and small in variation (specifically to homogenize the composition) in complex carbonitride hard phases 11. From the viewpoint described above, the cross-sectional area of homogeneous composition hard phases 11$h$ is preferably greater than or equal to 85%, more preferably greater than or equal to 90% of the cross-sectional area of complex carbonitride hard phases 11. In addition, homogeneous composition hard phases 11$h$ are preferably greater than or equal to 85%, more preferably greater than or equal to 90% of complex carbonitride hard phases 11 in number.

A median phase diameter D50 of complex carbonitride hard phases 11 is preferably greater than or equal to 0.3 μm and less than or equal to 5.0 μm, more preferably greater than or equal to 0.5 μm and less than or equal to 3.0 μm, from the viewpoint of increasing both the hardness and the fracture toughness of the hard alloy used for cutting tools. Here, the median phase diameter D50 of complex carbonitride hard phases 11 is measured by calculating, with image analysis software, an equivalent circle diameter from a cross-sectional observation image obtained by an SEM (scanning electron microscope). The equivalent circle diameter can be also determined by analyzing a crystal particle structure of a hard phase with use of SEM/EBSD (electron backscatter diffraction) and using crystal orientation analysis software.

As regards percentages of the cross-sectional areas of complex carbonitride hard phases 11 and metal binder phase 12 in hard alloy 10 according to the present embodiment, the cross-sectional area of complex carbonitride hard phases 11 is preferably greater than or equal to 80% and less than or equal to 97%, more preferably greater than or equal to 84% and less than or equal to 92%, and the cross-sectional area of metal binder phase 12 is preferably greater than or equal to 3% and less than or equal to 20%, more preferably greater than or equal to 8% and less than or equal to 16%, from the viewpoint that hard alloy 10 is high in both hardness and fracture toughness.

Figure 5:
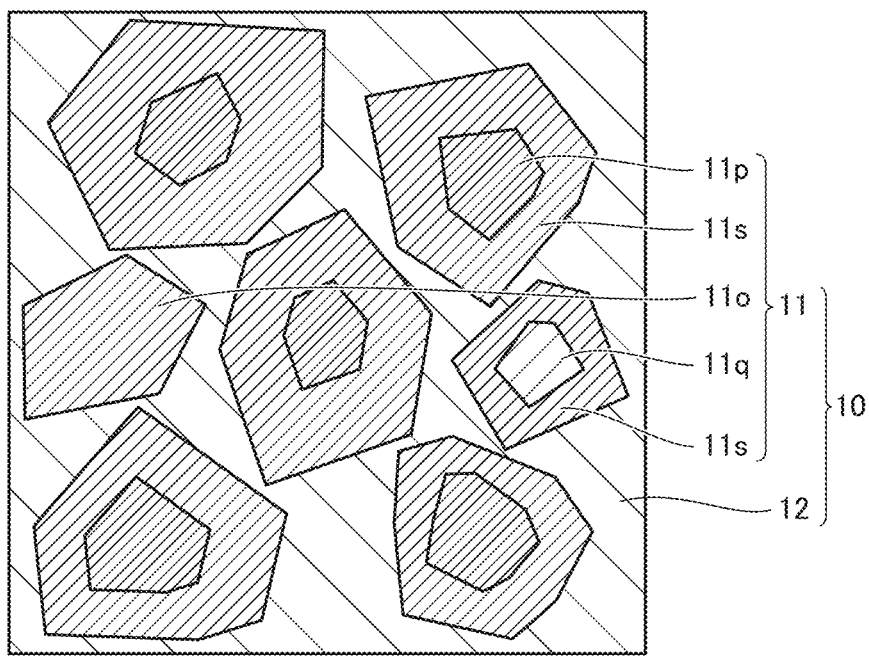
FIG. 5 is a schematic view illustrating one example of a cross-sectional structure of a conventional hard alloy.

It should be noted that, conventional hard alloy 10 is manufactured with use of conventional complex carbonitride powder 1 (that is, a powder that is formed of complex carbonitride particles not containing the homogeneous composition particles homogeneous in composition of Ti and the additional element in the particles), resulting in the cases where, as illustrated in FIG. 5, many of complex carbonitride hard phases 11 included in the hard alloy are dual phases formed of a core phase 11$p$ or 11$q$ and a peripheral phase 11$s$ that are different from each other in composition of Ti and the additional element. Even when the complex carbonitride hard phases include a single phase 11$o$, it is exceedingly rare for the single phase to be a homogeneous composition hard phase homogeneous in composition of Ti and the additional element in the phase. Thus, it is difficult for conventional hard alloy 10 to increase various physical properties such as hardness and fracture toughness together.

{Method for Producing Hard Alloy}

A method for producing hard alloy 10 according to the present embodiment is not particularly limited as long as the method is appropriate for production of hard alloy 10 according to the present embodiment. The method, however, is preferably a powder metallurgy technique from the viewpoint of enabling near net shape molding.

EXAMPLES

Examples 1 to 11

Examples 1 to 11 are examples of the complex carbonitride powder according to Embodiment 1 and the method for producing the complex carbonitride powder according to Embodiment 2.

1. Formation of Mixed Powder by Mixing Oxide Powders with Carbon Source Powder

Table 1 shows, in Examples 1 to 11, starting raw materials, i.e., oxide powders, namely a $TiO_2$ powder and an additional element oxide ($ZrO_2$, $HfO_2$, $V_2O_5$, $Nb_2O_5$, $Ta_2O_5$, $Cr_2O_3$, $MoO_3$, $WO_3$, $Al_2O_3$, and $SiO_2$) powder and a carbon source powder, namely a graphite powder.

The starting raw materials were mixed in blending ratios to give designed composition.

The mixing was performed by a wet ball mill method. The median particle diameter D50 of the mixed powder obtained is measured by calculating, with image analysis software, an equivalent circle diameter from an external observation image obtained by an SEM (scanning electron microscope). The results are shown in Table 1.

2. Formation of Granules by Granulating Mixed Powder

The mixed powder was formed into circular column-shaped granules having an average diameter of 2.4 mm and an average length of about 10 mm by a known extrusion granulation machine (hole diameter: $\phi$2.5 mm). Here, the average diameter and the average length of the granules were measured by a micrometer.

3. Formation of Complex Carbonitride Powder by Subjecting Granules to Heat Treatment The granules were subjected to a heat treatment by a heat treatment device 100 illustrated in FIG. 3, namely a rotary kiln in an atmosphere of a nitrogen gas as a nitrogen atmosphere gas at a heat treatment temperature shown in Table 1 to give a complex carbonitride powder. The granules passed a heating zone with a passing time of about 30 minutes. The obtained complex carbonitride powder was subjected to measurement through SEM/EDX and EPMA for a wrapped cut surface obtained by embedding complex carbonitride powder 1 in a resin, cutting the powder together with the resin, and wrapping the cut surface, to obtain a percentage of a cross-sectional area of homogeneous composition particles 1$ph$ to a cross-sectional area of complex carbonitride particles 1$p$ and a percentage of the number of homogeneous composition particles 1$ph$ to the number of complex carbonitride particles 1$p$ in the obtained complex carbonitride powder. The results are shown in Table 1.

TABLE 1

| | | | | | | Homogeneous composition particle | |
|---|---|---|---|---|---|---|---|
| Example | Designed composition (atom ratio) | Starting raw material | Median particle diameter of mixed powder (μm) | Heat treatment device | Heat treatment temperature (° C.) | Percentage of cross-sectional area (%) | Percentage of number of particles (%) |
| 1 | $(Ti_{0.75}W_{0.25})CN$ | Oxide powder/ Graphite powder | 0.33 | Rotary kiln | 1800 | 92.1 | 92 |
| 2 | $(Ti_{0.77}Mo_{0.23})CN$ | Oxide powder/ Graphite powder | 0.29 | Rotary kiln | 1800 | 93.3 | 94 |
| 3 | $(Ti_{0.85}Nb_{0.15})CN$ | Oxide powder/ Graphite powder | 0.25 | Rotary kiln | 1800 | 92.7 | 92 |
| 4 | $(Ti_{0.80}Ta_{0.20})CN$ | Oxide powder/ Graphite powder | 0.26 | Rotary kiln | 1800 | 94.7 | 96 |
| 5 | $(Ti_{0.95}V_{0.05})CN$ | Oxide powder/ Graphite powder | 0.27 | Rotary kiln | 1800 | 93.1 | 94 |
| 6 | $(Ti_{0.95}Cr_{0.05})CN$ | Oxide powder/ Graphite powder | 0.32 | Rotary kiln | 1800 | 96.6 | 96 |
| 8 | $(Ti_{0.95}Si_{0.05})CN$ | Oxide powder/ Graphite powder | 0.32 | Rotary kiln | 1800 | 96.5 | 96 |
| 7 | $(Ti_{0.95}Al_{0.05})CN$ | Oxide powder/ Graphite powder | 0.27 | Rotary kiln | 2000 | 93.6 | 92 |
| 9 | $(Ti_{0.90}Zr_{0.10})CN$ | Oxide powder/ Graphite powder | 0.34 | Rotary kiln | 2000 | 94.7 | 96 |
| 10 | $(Ti_{0.90}Hf_{0.10})CN$ | Oxide powder/ Graphite powder | 0.29 | Rotary kiln | 2200 | 93.2 | 96 |
| 11 | $(Ti_{0.75}W_{0.25})CN$ | Oxide powder/ Graphite powder | 0.78 | Rotary kiln | 1800 | 90.2 | 90 |

Figure 6:
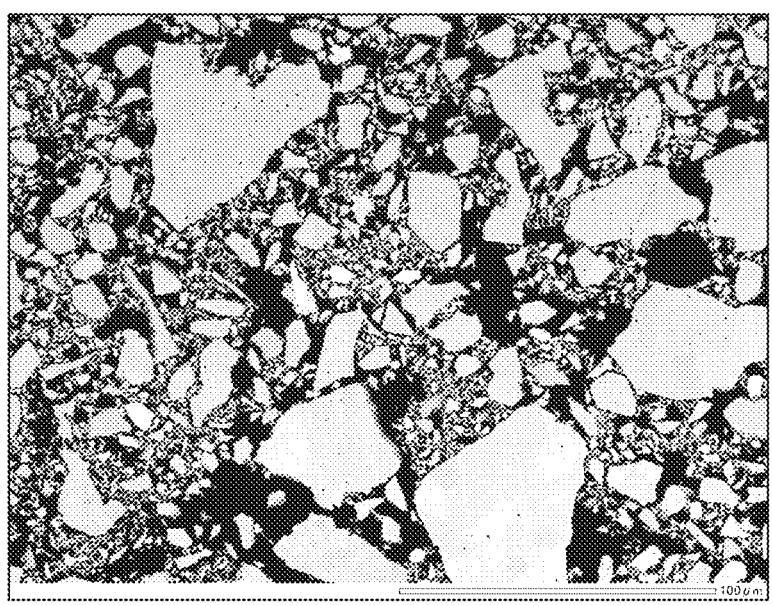
FIG. 6 is an electron micrograph showing a cross-sectional structure of a complex carbonitride powder in Example 2 according to the present invention.

FIG. 6 shows an SEM photograph of a cross-sectional structure on the cut surface of the complex carbonitride powder that was obtained in Example 2 and had not been subjected to particle diameter adjustment after the heat treatment. As regards 30 complex carbonitride particles randomly selected from the complex carbonitride powder that was obtained in Example 2 and had not been subjected to particle diameter adjustment after the heat treatment, the cut surface was measured through SEM/EDX and EPMA for average concentrations of Ti and the additional element in each complex carbonitride particle against average concentrations of Ti and the additional element in all the 30 particles, and each of the complex carbonitride particles was determined whether or not it was a homogeneous composition particle. The results are shown in Table 2. In Table 2, values representing the average concentrations of the elements were rounded off to one decimal place to give an error in the first decimal place, so that the total of the elements is not always 100 atom %. In Table 2, the average concentrations of Ti (75.5 atom % to 81.8 atom %) in each complex carbonitride particle were in a range of 72.6 atom % to 82.6 atom % that was greater than or equal to −5 atom % and less than or equal to 5 atom % of the average concentration of Ti (77.6 atom %) in all the 30 complex carbonitride particles. The average concentrations of Mo (18.0 atom % to 24.3 atom %) in each complex carbonitride particle were in a range of 17.2 atom % to 27.2 atom % that was greater than or equal to −5 atom % and less than or equal to 5 atom % of the average concentration of Mo (22.2 atom %) in all the 30 complex carbonitride particles. The average concentrations of W (0.1 atom % to 0.2 atom %) in each complex carbonitride particle were in a range of greater than or equal to −5 atom % and less than or equal to 5 atom % of the average concentration of W (0.2 atom %) in all the 30 complex carbonitride particles.

TABLE 2

| Particle number | Average concentration (atom %) | | | Homogeneous composition particle determination |
| --- | --- | --- | --- | --- |
| | Ti | Mo | W (slight amount) | |
| 1 | 77.5 | 22.3 | 0.2 | Homogeneous composition particle |
| 2 | 77.5 | 22.3 | 0.2 | Homogeneous composition particle |
| 3 | 77.7 | 22.2 | 0.2 | Homogeneous composition particle |
| 4 | 75.5 | 24.3 | 0.2 | Homogeneous composition particle |
| 5 | 77.1 | 22.8 | 0.1 | Homogeneous composition particle |
| 6 | 77.6 | 22.3 | 0.2 | Homogeneous composition particle |
| 7 | 76.3 | 23.5 | 0.2 | Homogeneous composition particle |
| 8 | 79.9 | 20.0 | 0.2 | Homogeneous composition particle |
| 9 | 77.0 | 22.9 | 0.2 | Homogeneous composition particle |
| 10 | 76.8 | 23.1 | 0.2 | Homogeneous composition particle |
| 11 | 77.6 | 22.2 | 0.2 | Homogeneous composition particle |
| 12 | 77.0 | 22.8 | 0.2 | Homogeneous composition particle |
| 13 | 76.2 | 23.6 | 0.2 | Homogeneous composition particle |
| 14 | 77.3 | 22.5 | 0.2 | Homogeneous composition particle |
| 15 | 78.0 | 21.9 | 0.2 | Homogeneous composition particle |
| 16 | 76.4 | 23.5 | 0.1 | Homogeneous composition particle |
| 17 | 77.8 | 22.1 | 0.2 | Homogeneous composition particle |
| 18 | 81.8 | 18.0 | 0.2 | Homogeneous composition particle |
| 19 | 77.1 | 22.7 | 0.2 | Homogeneous composition particle |
| 20 | 77.4 | 22.4 | 0.2 | Homogeneous composition particle |
| 21 | 77.3 | 22.5 | 0.2 | Homogeneous composition particle |
| 22 | 77.7 | 22.1 | 0.1 | Homogeneous composition particle |
| 23 | 77.6 | 22.2 | 0.2 | Homogeneous composition particle |
| 24 | 79.3 | 20.5 | 0.2 | Homogeneous composition particle |
| 25 | 77.2 | 22.6 | 0.2 | Homogeneous composition particle |
| 26 | 78.0 | 21.9 | 0.2 | Homogeneous composition particle |
| 27 | 77.5 | 22.3 | 0.2 | Homogeneous composition particle |
| 28 | 77.9 | 21.9 | 0.2 | Homogeneous composition particle |
| 29 | 77.7 | 22.2 | 0.2 | Homogeneous composition particle |
| 30 | 77.8 | 22.0 | 0.2 | Homogeneous composition particle |
| Average | 77.6 | 22.2 | 0.2 | |

Figure 7:
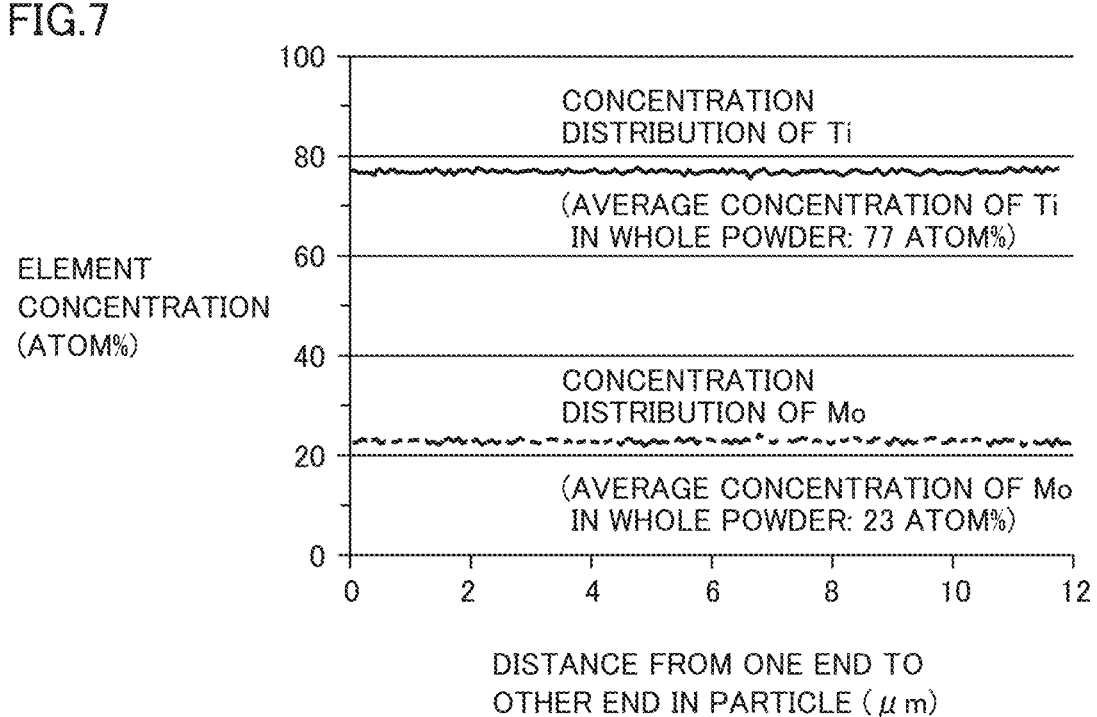
FIG. 7 is a graph illustrating concentration distributions of titanium and an additional element of a homogeneous composition particle in complex carbonitride particles of the complex carbonitride powder in Example 2 according to the present invention.

Further, FIG. 7 shows a graph illustrating concentration distributions of titanium (Ti) and the additional element molybdenum (Mo) of a homogeneous composition particle in the complex carbonitride particles of the complex carbonitride powder that was obtained in Example 2 and had not been subjected to particle diameter adjustment after the heat treatment. As illustrated in FIG. 7, because the average concentrations of Ti and Mo in the whole complex carbonitride powder were 77 atom % and 23 atom %, respectively, the average concentrations of Ti and Mo in the homogeneous composition particle were in the range of greater than or equal to −5 atom % and less than or equal to 5 atom % of the average concentrations of Ti and Mo in the whole complex carbonitride powder.

Figure 8:
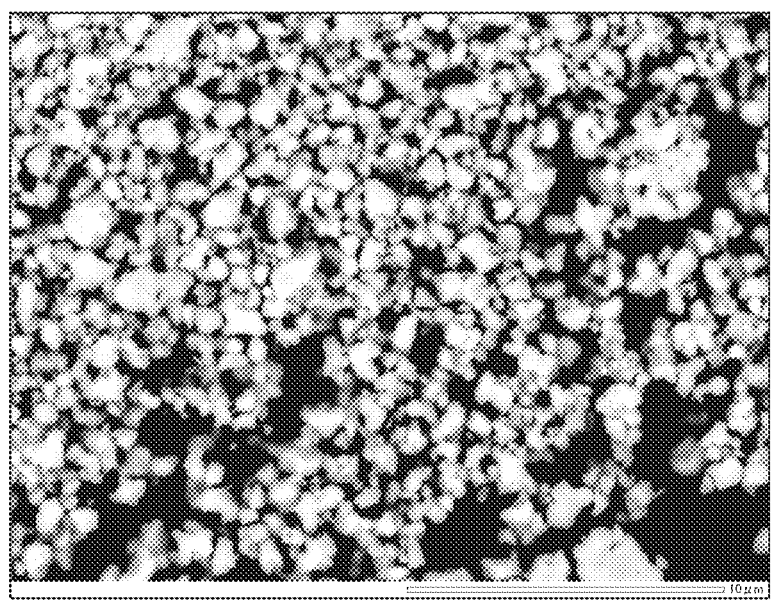
FIG. 8 is an electron micrograph showing a cross-sectional structure of a complex carbonitride powder in Example 3 according to the present invention.

FIG. 8 shows an SEM photograph of a cross-sectional structure on the cut surface of the complex carbonitride powder that was obtained in Example 3 and had not been subjected to particle diameter adjustment after the heat treatment. As regards 30 complex carbonitride particles randomly selected from the complex carbonitride powder that was obtained in Example 3 and had not been subjected to particle diameter adjustment after the heat treatment, the cross section was measured through SEM/EDX and EPMA for average concentrations of Ti and the additional element in each complex carbonitride particle against average concentrations of Ti and the additional element in all the 30 complex carbonitride particles, and each of the complex carbonitride particles was determined whether or not it was a homogeneous composition particle. The results are shown in Table 3. In Table 3, values representing the average concentrations of the elements were rounded off to one decimal place to give an error in the first decimal place, so that the total of the elements is not always 100 atom %. In Table 3, the average concentrations of Ti (81.9 atom % to 86.1 atom %) in each complex carbonitride particle were in a range of 79.2 atom % to 89.2 atom % that was greater than or equal to −5 atom % and less than or equal to 5 atom % of the average concentration of Ti (84.2 atom %) in all the 30 complex carbonitride particles. The average concentrations of Nb (13.8 atom % to 17.9 atom %) in each complex carbonitride particle were in a range of 10.6 atom % to 20.6 atom % that was greater than or equal to −5 atom % and less than or equal to 5 atom % of the average concentration of Nb (15.6 atom %) in all the 30 complex carbonitride particles. The average concentrations of W (0.1 atom % to 0.5 atom %) in each complex carbonitride particle were in a range of greater than or equal to −5 atom % and less than or equal to 5 atom % of the average concentration of W (0.2 atom %) in all the 30 complex carbonitride particles.

TABLE 3

Figure 9:
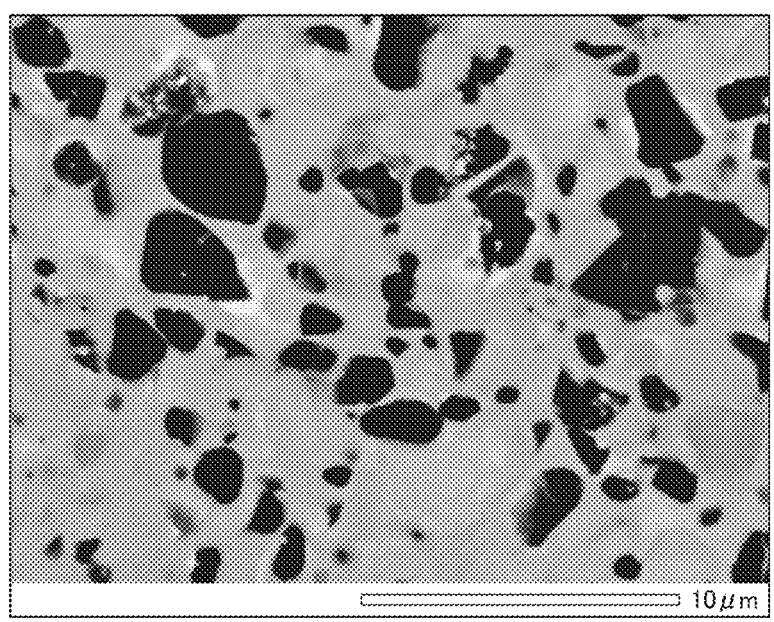
FIG. 9 is an electron micrograph showing a cross-sectional structure of a complex carbonitride powder in Comparative Example 4.

| Particle number | Average concentration (atom %) | | | Homogeneous composition particle determination |
|---|---|---|---|---|
| | Ti | Nb | W (slight amount) | |
| 1 | 83.2 | 16.7 | 0.1 | Homogeneous composition particle |
| 2 | 82.7 | 17.2 | 0.1 | Homogeneous composition particle |
| 3 | 82.7 | 16.3 | 1.0 | Homogeneous composition particle |
| 4 | 83.1 | 16.8 | 0.1 | Homogeneous composition particle |
| 5 | 85.0 | 14.9 | 0.1 | Homogeneous composition particle |
| 6 | 84.8 | 15.1 | 0.2 | Homogeneous composition particle |
| 7 | 84.8 | 15.1 | 0.1 | Homogeneous composition particle |
| 8 | 84.0 | 15.7 | 0.4 | Homogeneous composition particle |
| 9 | 85.7 | 14.2 | 0.1 | Homogeneous composition particle |
| 10 | 85.3 | 14.6 | 0.1 | Homogeneous composition particle |
| 11 | 81.9 | 17.9 | 0.2 | Homogeneous composition particle |
| 12 | 82.3 | 17.6 | 0.1 | Homogeneous composition particle |
| 13 | 84.7 | 15.3 | 0.1 | Homogeneous composition particle |
| 14 | 85.1 | 14.8 | 0.1 | Homogeneous composition particle |
| 15 | 83.9 | 15.7 | 0.5 | Homogeneous composition particle |
| 16 | 83.9 | 16.0 | 0.1 | Homogeneous composition particle |
| 17 | 84.9 | 14.9 | 0.2 | Homogeneous composition particle |
| 18 | 84.4 | 15.5 | 0.1 | Homogeneous composition particle |
| 19 | 83.6 | 16.2 | 0.1 | Homogeneous composition particle |
| 20 | 86.0 | 13.9 | 0.2 | Homogeneous composition particle |
| 21 | 84.2 | 15.7 | 0.2 | Homogeneous composition particle |
| 22 | 85.8 | 14.1 | 0.1 | Homogeneous composition particle |
| 23 | 85.5 | 14.5 | 0.1 | Homogeneous composition particle |
| 24 | 84.5 | 15.4 | 0.1 | Homogeneous composition particle |
| 25 | 84.6 | 15.3 | 0.1 | Homogeneous composition particle |
| 26 | 84.8 | 15.1 | 0.1 | Homogeneous composition particle |
| 27 | 82.9 | 16.7 | 0.4 | Homogeneous composition particle |
| 28 | 86.1 | 13.8 | 0.1 | Homogeneous composition particle |
| 29 | 83.4 | 16.5 | 0.1 | Homogeneous composition particle |
| 30 | 82.4 | 17.4 | 0.2 | Homogeneous composition particle |
| Average | 84.2 | 15.6 | 0.2 | | indicated in Comparative Example 1 of Table 4 and a batch furnace was used as a heat treatment device. In Comparative Example 2, a complex carbonitride powder was obtained in the same manner as in Example 1 except that the starting materials, i.e., a titanium carbonitride powder (average particle diameter 3 μm) and a tungsten carbide powder (average particle diameter 5.6 μm) were mixed in such a blending ratio as to give the designed composition indicated in Comparative Example 2 of Table 4. In Comparative Examples 3 to 5, a complex carbonitride powder was obtained in the same manner as in Example 1 except that the starting materials, i.e., a titanium carbonitride powder (average particle diameter 3 μm) and a tungsten carbide powder (average particle diameter 5.6 μm) were mixed in such a blending ratio as to give the designed composition indicated in each of Comparative Example 3 to 5 of Table 4 and a hot press was used as a heat treatment device. The average particle diameters of the powders used as the starting materials in Comparative Examples 1 to 5 were determined by the Fischer method. It should be noted that the hot press and mixed powders containing fine particles were used in Comparative Examples 3 to 5 to promote a solid solution reaction. Regarding Comparative Examples 1 to 5, Table 4 shows a median particle diameter of the mixed powder, and a percentage of a cross-sectional area of homogeneous composition particles to a cross-sectional area of complex carbonitride particles and a percentage of the number of the homogeneous composition particles to the number of the complex carbonitride particles in the complex carbonitride powder. FIG. 9 shows an SEM photograph of a cross-sectional structure of the complex carbonitride powder obtained in Comparative Example 4.

TABLE 4

| Comparative Example | Designed composition (atom ratio) | Starting raw material | Median particle diameter of mixed powder (μm) | Heat treatment device | Heat treatment temperature (° C.) | Homogeneous composition particle | |
|---|---|---|---|---|---|---|---|
| | | | | | | Percentage of cross-sectional area (%) | Percentage of number of particles (%) |
| 1 | $(Ti_{0.75}W_{0.25})CN$ | Carbonitride powder/Metal powder | 12.1 | Batch furnace | 1800 | 54.6 | 58 |
| 2 | $(Ti_{0.75}W_{0.25})CN$ | Carbonitride powder | 4.6 | Rotary kiln | 1800 | 9.5 | 14 |
| 3 | $(Ti_{0.75}W_{0.25})CN$ | Carbonitride powder | 4.6 | Hot press | 1800 | 14.4 | 10 |
| 4 | $(Ti_{0.75}W_{0.25})CN$ | Carbonitride powder | 4.6 | Hot press | 2200 | 53.3 | 54 |
| 5 | $(Ti_{0.75}W_{0.25})CN$ | Carbonitride powder | 0.43 | Hot press | 2200 | 71.8 | 76 |

As is clear from Tables 1 to 3 and FIGS. 6 and 8, the methods for producing a complex carbonitride powder according to Embodiment 2 could give the complex carbonitride powders according to Embodiment 1 that included complex carbonitride particles including many homogeneous composition particles homogeneous in composition in the particles.

Comparative Examples 1 to 5

Comparative Examples 1 to 5 are comparative examples of conventional complex carbonitride powders.

In Comparative Example 1, a complex carbonitride powder was obtained in the same manner as in Example 1 except that the starting materials, i.e., a titanium carbonitride powder (average particle diameter 3 μm) and a metal tungsten powder (average particle diameter 20 μm) were mixed in such a blending ratio as to give the designed composition As is clear from Table 4 and FIG. 9, all the methods for producing a conventional complex carbonitride powder could not give the complex carbonitride powder according to Embodiment 1 that included complex carbonitride particles including many homogeneous composition particles homogeneous in composition in the particles.

Examples 12 to 14

Examples 12 to 14 are examples of hard alloys manufactured with use of the complex carbonitride powder according to Embodiment 1.

Figure 10:
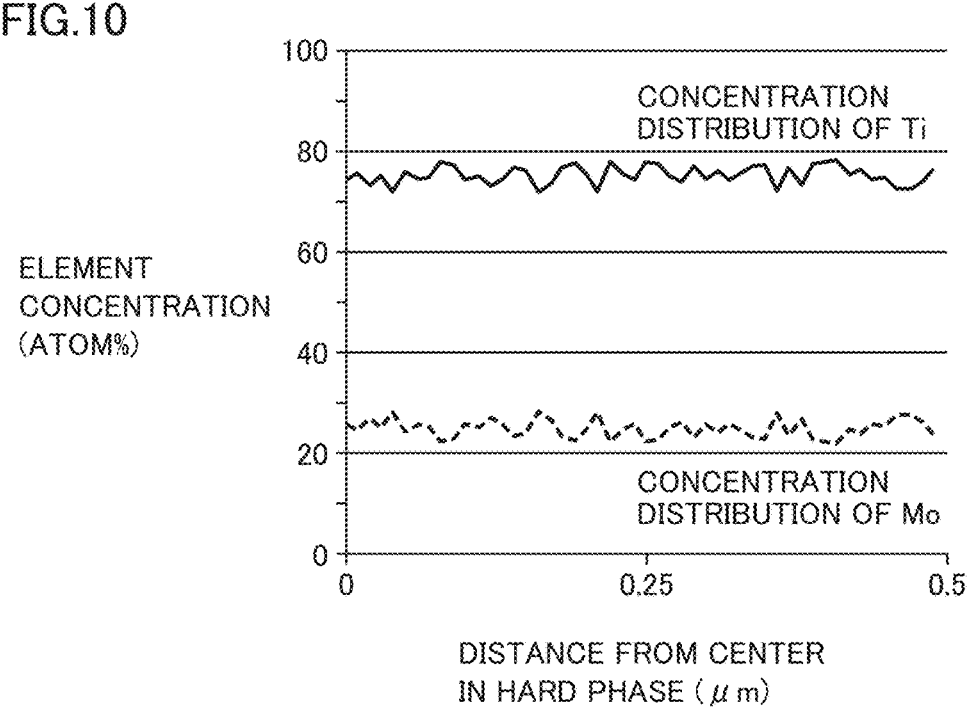
FIG. 10 is a graph illustrating concentration distributions of titanium and an additional element of a homogeneous composition hard phase in complex carbonitride hard phases of a hard alloy manufactured in Example 13 according to the present invention.

In Examples 12 to 14, the complex carbonitride powder obtained in each of Examples 1 to 3, a metal cobalt powder (average particle diameter 1.5 μm), and a metal nickel powder (average particle diameter 2.5 μm) were used and a hard alloy having designed composition indicated in Table 5 was manufactured by a powder metallurgy technique. The average particle diameters of the metal cobalt powder and the metal nickel powder were determined by the Fischer method. The obtained hard alloy was subjected to measurement through SEM/EDX and EPMA for a wrapped cut surface obtained by cutting the hard alloy and wrapping the cut surface, to obtain a percentage of a cross-sectional area of homogeneous composition hard phases to a cross-sectional area of complex carbonitride hard phases and a percentage of the number of the homogeneous composition hard phases to the number of the complex carbonitride hard phases in the obtained hard alloy. As the hardness of the hard alloy, the Vickers hardness was measured in accordance with JIS Z2244: 2009. The fracture toughness of the hard alloy was measured in accordance with JIS R1607: 1995. The results are shown in Table 5. FIG. 10 shows concentration distributions of titanium (Ti) and the additional element molybdenum (Mo) of a homogeneous composition hard phase in complex carbonitride hard phases in Example 13.

carbide powder (average particle diameter 5.0 µm), a molybdenum carbide powder (average particle diameter 2.0 µm), and a niobium carbide powder (average particle diameter 1.8 µm) were blended to give the same composition of the complex carbonitride powder according to each of Examples 12 to 14, fired for integration by a hot press at 2200° C. for 2 hours, and then pulverized to give a complex carbonitride powder for use. The pulverized complex carbonitride powder had a median particle diameter of about 3.5 µm. This complex carbonitride powder, a metal cobalt powder (average particle diameter 1.5 µm), and a metal nickel powder (average particle diameter 2.5 µm) were mixed and a hard alloy having designed composition indicated in Table 6 was manufactured by a powder metallurgy technique. The average particle diameters of the powders used as the starting materials in Comparative Examples 6 to 8 were determined by the Fischer method. The obtained hard alloy was measured for a percentage of a cross-sectional area of homoge-

TABLE 5

| | | Homogeneous composition hard phase | | | |
|---|---|---|---|---|---|
| Example | Designed composition (vol %) | Percentage of cross-sectional area (%) | Percentage of number of particles (%) | Hardness (GPa) | Fracture toughness (MPa · m$^{0.5}$) |
| 12 | 84(Ti$_{0.75}$W$_{0.25}$)CN—8Co—8Ni | 82.4 | 84 | 14.3 | 8.5 |
| 13 | 88(Ti$_{0.77}$Mo$_{0.23}$)CN—6Co—6Ni | 94.4 | 98 | 14.8 | 8.3 |
| 14 | 90(Ti$_{0.85}$Nb$_{0.15}$)CN—5Co—5Ni | 94.2 | 94 | 13.2 | 8.7 |

As is clear from Table 5 and FIG. 10, the hard alloys according to Embodiment 3 included complex carbonitride hard phases including many homogeneous composition hard phases homogeneous in composition in the phases and were high in both hardness and fracture toughness, the hard alloys being manufactured with use of the complex carbonitride powders according to Embodiment 1 that included complex carbonitride particles including many homogeneous composition particles homogeneous in composition in the particles. As described above, with use of the complex carbonitride powder according to Embodiment 1 that includes complex carbonitride particles including many homogeneous composition particles homogeneous in composition in the particles, it was found that it is possible to obtain the hard alloy according to Embodiment 3 that is high in both hardness and fracture toughness.

Comparative Examples 6 to 8

Comparative Examples 6 to 8 are comparative examples of conventional hard alloys.

Figure 11:
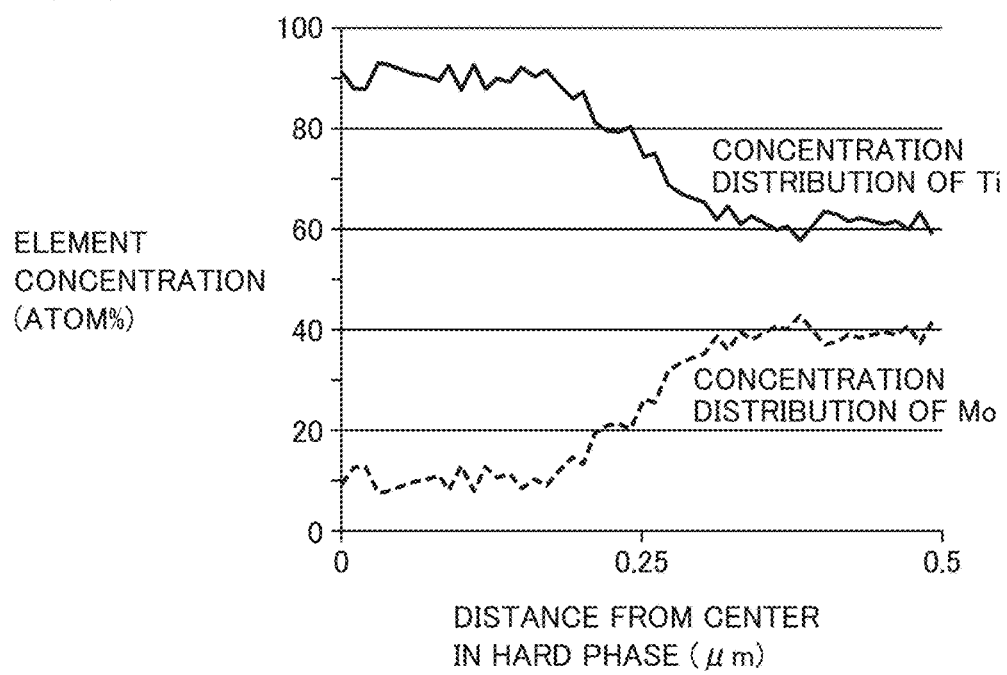
FIG. 11 is a graph illustrating concentration distributions of titanium and an additional element of a complex carbonitride hard phase in a hard alloy manufactured in Comparative Example 7.

In Comparative Examples 6 to 8, a titanium carbonitride powder (average particle diameter 3.0 µm), a tungsten neous composition hard phases to a cross-sectional area of complex carbonitride hard phases, a percentage of the number of the homogeneous composition hard phases to the number of the complex carbonitride hard phases, the hardness, and the fracture toughness. The results are shown in Table 6. FIG. 11 shows concentration distributions of titanium (Ti) and the additional element molybdenum (Mo) of a complex carbonitride hard phase in Comparative Example 7.

TABLE 6

| | | Homogeneous composition hard phase | | | |
|---|---|---|---|---|---|
| Comparative Example | Designed composition (vol %) | Percentage of cross-sectional area (%) | Percentage of number of particles (%) | Hardness (GPa) | Fracture toughness (MPa · m$^{0.5}$) |
| 6 | 59.9TiCN—24.1WC—8Co—8Ni | 7.3% | 14% | 14.3 | 6.4 |
| 7 | 68.6TiCN—19.4Mo$_2$C—6Co—6Ni | 8.2% | 12% | 14.7 | 5.9 |
| 8 | 74.9TiCN—15.1NbC—5Co—5Ni | 6.0% | 22% | 13.3 | 5.1 |

As is clear from Table 6 and FIG. 11, the hard alloys manufactured with use of the conventional complex carbonitride powders included complex carbonitride hard phases hardly including homogeneous composition hard phases homogeneous in composition in the phases and were low in fracture toughness even though being high in hardness, the conventional complex carbonitride powders hardly including homogeneous composition particles homogeneous in composition in the particles.

The embodiments and the examples that have been disclosed this time should be considered in all aspects as exemplary but not as limiting. The scope of the present invention is defined by the claims, rather than the above description, and is intended to include equivalents of the claims and any modifications within the claims.

REFERENCE SIGNS LIST

1: Complex carbonitride powder, 1p: Complex carbonitride particle, 1ph: Homogeneous composition particle, 10: Hard alloy, 11: Complex carbonitride hard phase, 11h: Homogeneous composition hard phase, 11o: Single phase, 11p, 11q: Core phase, 1is: Peripheral phase, 12: Metal binder phase, 100: Heat treatment device, 110: Rotary reaction tube, 110e: Gas outlet, 110i: Gas inlet, 110s: Raw material inlet, 110t: Heat-treated product outlet, 120: Rotary mechanism, 130: Heating mechanism, 140: Casing, S10: Mixing step, S20: Granulating step, S30: Heat treatment step

The invention claimed is:

1. A complex carbonitride powder consisting of a plurality of complex carbonitride particles comprising titanium as a main component element and at least one additional element selected from the group consisting of zirconium, hafnium, vanadium, niobium, tantalum, chromium, molybdenum, tungsten, aluminum, and silicon, the plurality of complex carbonitride particles including a plurality of homogeneous composition particles where average concentrations of titanium and the additional element in each complex carbonitride particle have a difference in a range of greater than or equal to −5 atom % and less than or equal to 5 atom % from average concentrations of titanium and the additional element in the complex carbonitride powder as a whole, and a total cross-sectional area of all the homogeneous composition particles being greater than or equal to 90% of a total cross-sectional area of all the complex carbonitride particles, and all the homogeneous composition particles being greater than or equal to 90% of all the complex carbonitride particles in number.

2. The complex carbonitride powder according to claim 1, wherein, in the homogeneous composition particles, concentration distributions of titanium and the additional element in each of the homogeneous composition particles are in a range of greater than or equal to −5 atom % and less than or equal to 5 atom % from the average concentrations of titanium and the additional element in the complex carbonitride powder as a whole.

* * * * *